J. W. COOK.
ROTARY ROCK CUTTER.
APPLICATION FILED APR. 3, 1913.
1,083,666.
Patented Jan. 6, 1914.
3 SHEETS—SHEET 2.
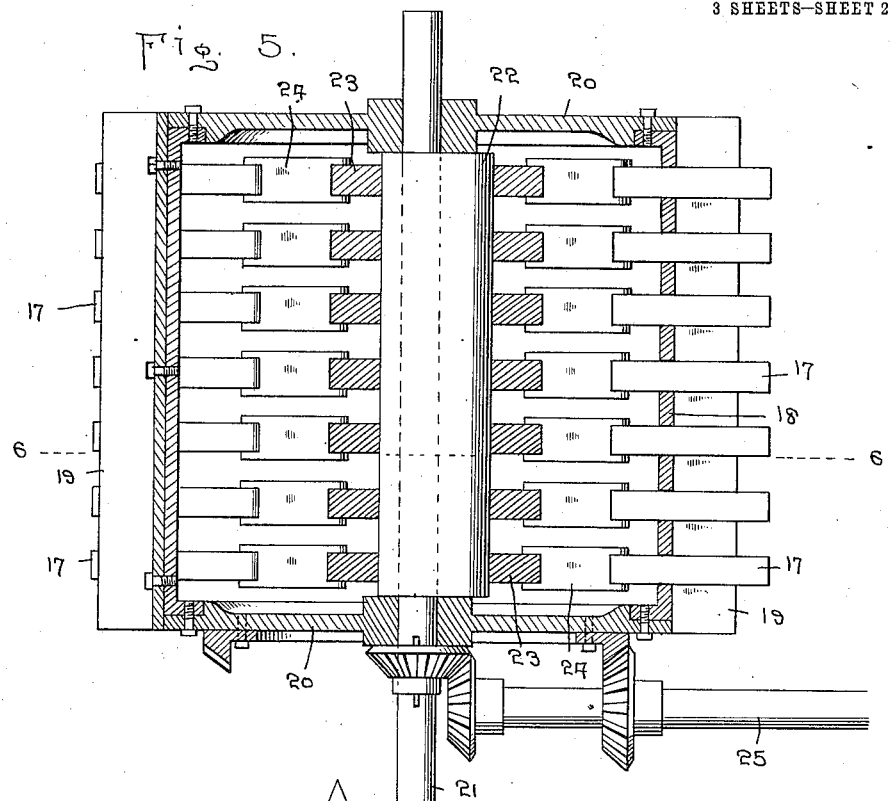
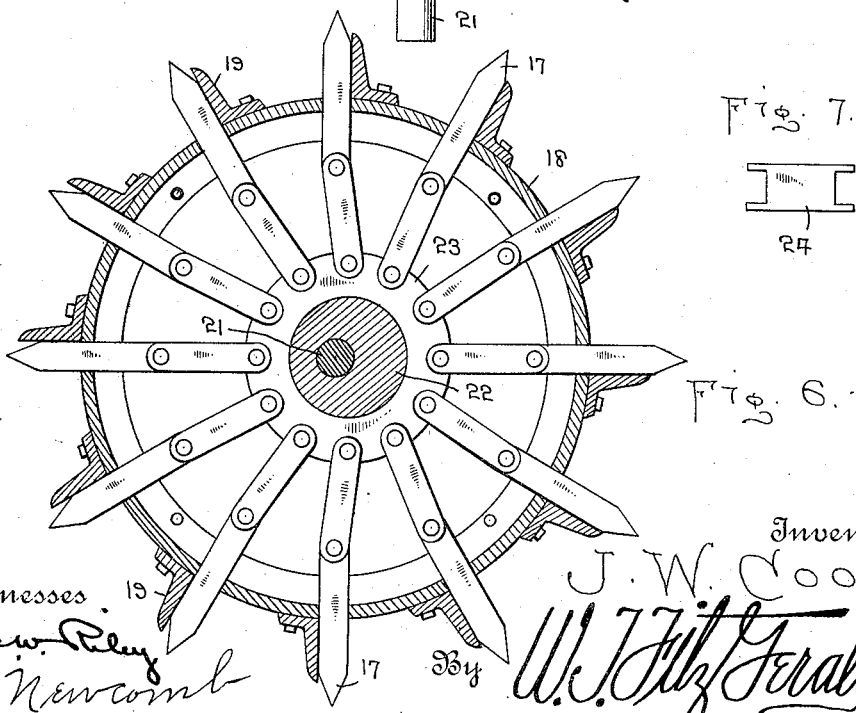
Witnesses
Thos. W. Riley
M. Newcomb
Inventor
J. W. Cook
By W. J. Fitz Gerald
Attorney J. W. COOK.
ROTARY ROCK CUTTER.
APPLICATION FILED APR. 3, 1913.
1,083,666.
Patented Jan. 6, 1914.
3 SHEETS—SHEET 3.
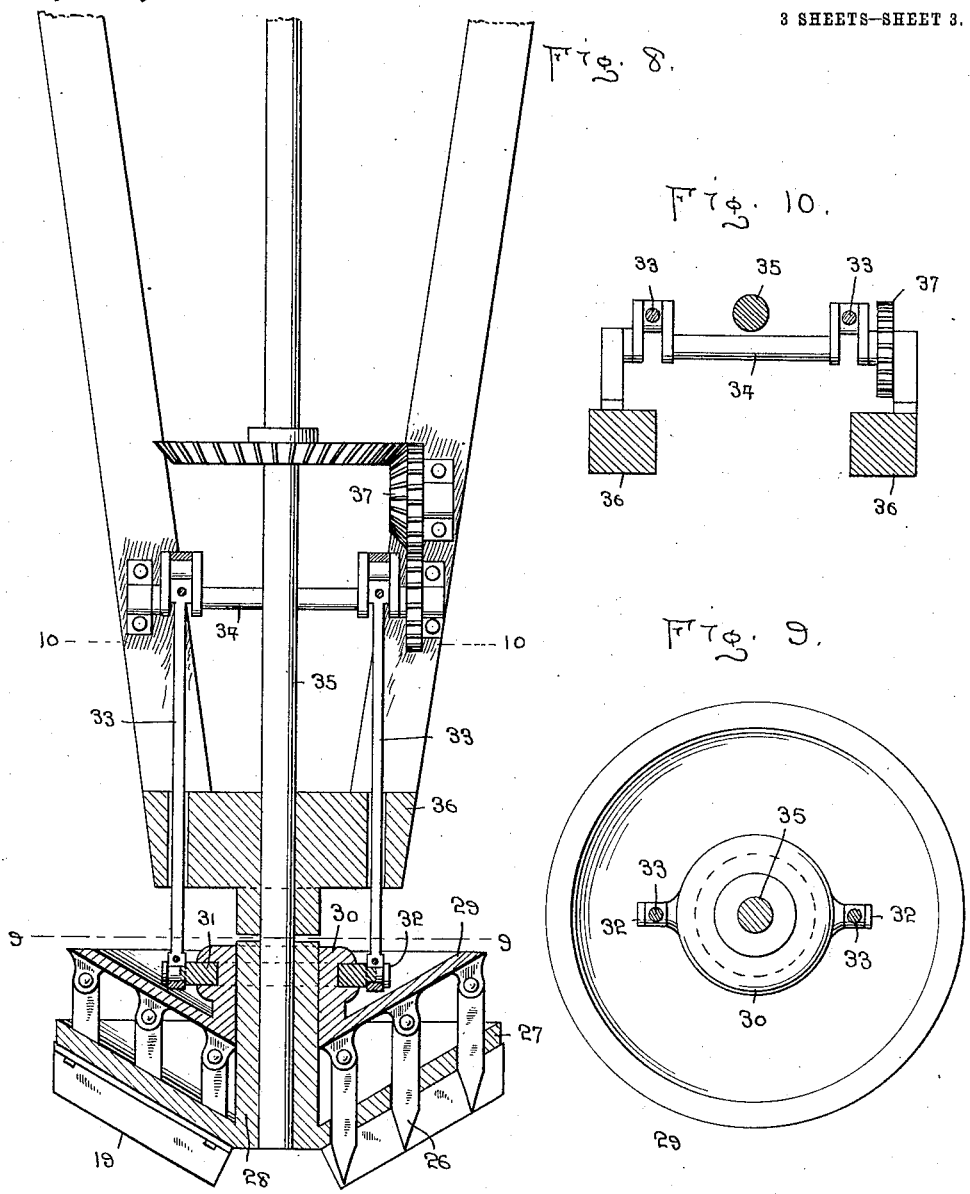

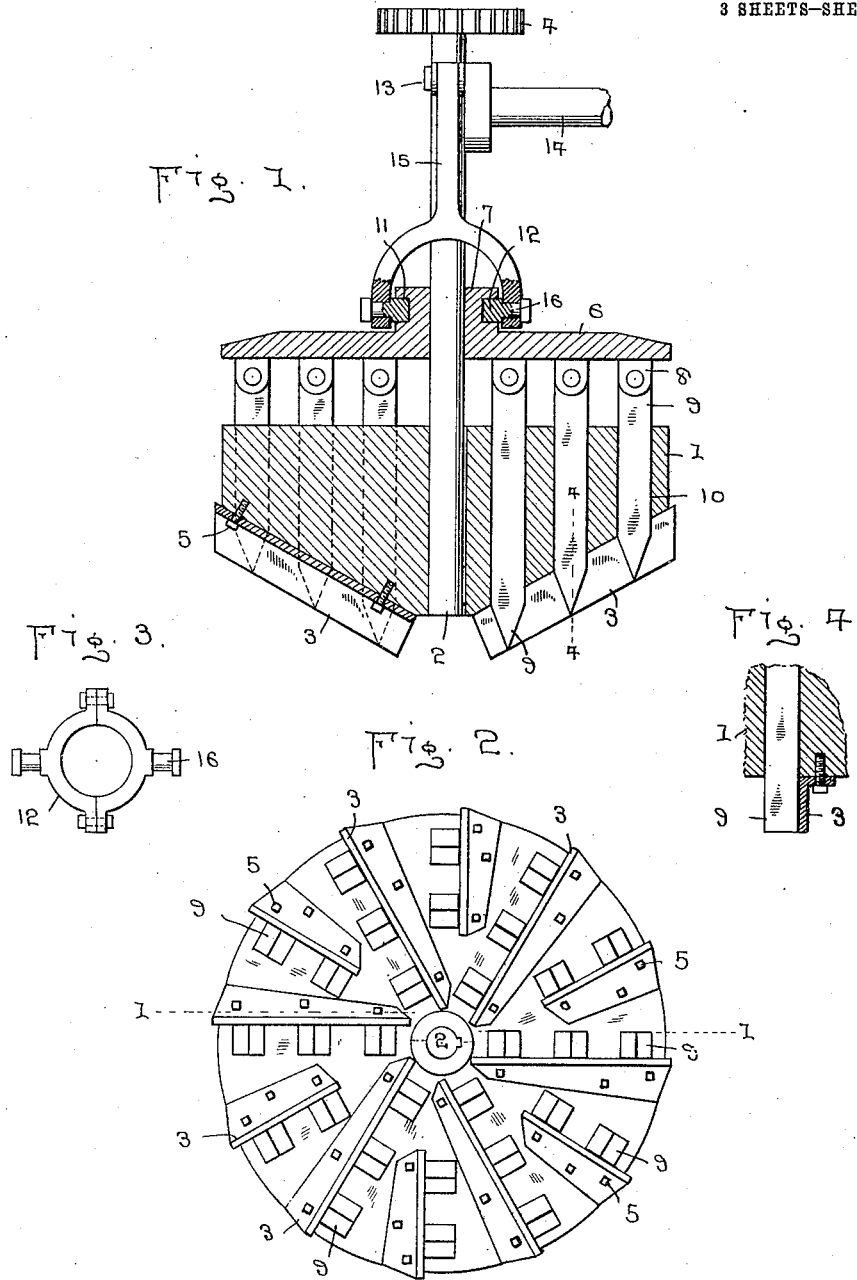

UNITED STATES PATENT OFFICE.

JOHN W. COOK, OF MIAMI, FLORIDA, ASSIGNOR OF ONE-THIRD TO GEORGE A. WALDECK, OF MIAMI, FLORIDA.

ROTARY ROCK-CUTTER.

1,083,666.  Specification of Letters Patent.  Patented Jan. 6, 1914.

Application filed April 3, 1913.   Serial No. 758,546.

*To all whom it may concern:*

Be it known that I, JOHN W. COOK, a citizen of the United States, residing at Miami, in the county of Dade and State of Florida, have invented certain new and useful Improvements in Rotary Rock-Cutters; and I do hereby declare the following to be a full, clear, and exact description of the invention, such as will enable others skilled in the art to which it appertains to make and use the same.

This invention has for its object the provision of a rotary rock cutter comprising a plurality of cutting tools having a combined reciprocatory and rotary movement.

Another object of the invention is the provision of a simple and efficient means for accomplishing the compound movement of the cutting tools.

Another object is to regulate the speed of the respective movements to afford the maximum cutting efficiency.

In the accompanying drawings, Figure 1 represents a sectional view through my improved rock cutter, the section being indicated by the line 1—1 of Fig. 2. Fig. 2 is a bottom plan view of the cutter. Fig. 3 is a plan view of a split collar used in connection with the cutter. Fig. 4 is a fragmentary detail view of a cuttter head, tool and cutter blade. Fig. 5 is a sectional view through a modified form of the invention. Fig. 6 is a sectional view taken at right angles to Fig. 5. Fig. 7 is a plan view of one of the links for connecting certain parts of the cutter. Fig. 8 is a further modified form of the cutter, partly in section. Fig. 9 is a sectional view on the line 9—9 of Fig. 8, and, Fig. 10 is a sectional view on the line 10—10 of Fig. 8.

Referring to the drawings, the numeral 1 indicates a cutter head keyed upon the main shaft 2 and carrying upon its lower face a plurality of radially arranged cutter blades 3. The shaft 2 is adapted to be supported by any desired form of frame (not shown) and the gear 4 thereon is adapted to be connected with a suitable source of power. The cutter head 1 is of a solid circular formation having a flat upper face and a tapered or conical lower face, over which are secured the cutter blades 3, by means of bolts or the like.

Loosely mounted over the shaft 2, above the cutter head 1, is a tool holder 6 having a hub 7. The under face of the tool holder is provided with a plurality of depending ears 8 carrying the pivoted cutting tools or chisels 9 engaging through openings 10 in the cutter head 1. The cutting tools 9 vary in length, those nearer the outer edge of the tool holder 6 being of less length than those adjacent the shaft 3, so that the points thereof correspond to the inclination of the bottom face of the cutter head 1. The hub 7 is channeled at 11 to provide a seat for the split collar 12, which is rotatably mounted therein. A crank 13 of a second or auxiliary shaft 14 is connected to the split ring 12 by the connecting rod 15 having a lower yoked end provided with openings through which are engaged the pins 16 carried by the split collar 12.

The main shaft 2 of the cutter is adapted to be rotated at substantially slow speed so as to move the cutting tools 9 in a circular path. The auxiliary shaft 14 is adapted to be driven at an increased speed to cause the cutting tools 9 to be reciprocated quickly, it being understood that the collar 12 with which the crank 13 is connected is rotatable in the hub of the tool holder 6.

In the modification of my invention disclosed in Figs. 5 to 7, the cutting tools 17 are mounted through a cylinder 18 and work against cutter blades 19. Heads 20 are bolted or otherwise fixed in the ends of the cylinder 18 and are centrally apertured to receive the shaft 21, which is rotatable therein. Inside of the cylinder 18 an eccentrically mounted sleeve 22 is fixed to the shaft 21 and is provided with a plurality of concentric rings 23 connected with the cutting tools 17 by the links 24. The shaft 21 is adapted to be driven by the drive shaft 25 by a pair of beveled gears interposed therebetween. The cylinder 18 is driven from the same drive shaft 25 through a second beveled gear mounted on said shaft and engaging a large beveled gear fixed to the adjacent head 20.

In the second modification of my invention the cutting tools 26 are all of the same length, and work through a cutter head 27, similar to the one disclosed in Figs. 1 to 4, but having a hub portion 28, over which is journaled the tool holder 29. The face of the tool holder 29, carrying the cutting tools 26, is shaped in conformity to the outer face of the cutter head 27. A hub 30 is formed on the holder 29 and is channeled to receive the split ring 31 having pins 32 thereon carrying connecting rods 33 mounted at their upper ends over the cranks in a crank shaft 34. The main shaft 35, to which is keyed the cutter head 27 is mounted in a suitable frame 36, which also carries the crank shaft 34. The main shaft 35 is adapted to be connected to any suitable source of power and drives the crank 34 through the medium of a train of gears 37.

What I claim is:

A rotary rock cutter comprising a rotatable cutter head and tool holder, cutting tools pivoted to said tool holder and projecting through said cutter head, and cutting blades secured to said cutter head.

In testimony whereof I have signed my name to this specification in the presence of two subscribing witnesses.

JOHN W. COOK.

Witnesses:
GEO. W. WALDECK,
MARY A. NALL.